Nov. 14, 1933.   J. L. BIGGS   1,935,385
SHELL AND MEAT SEPARATOR
Filed April 14, 1930
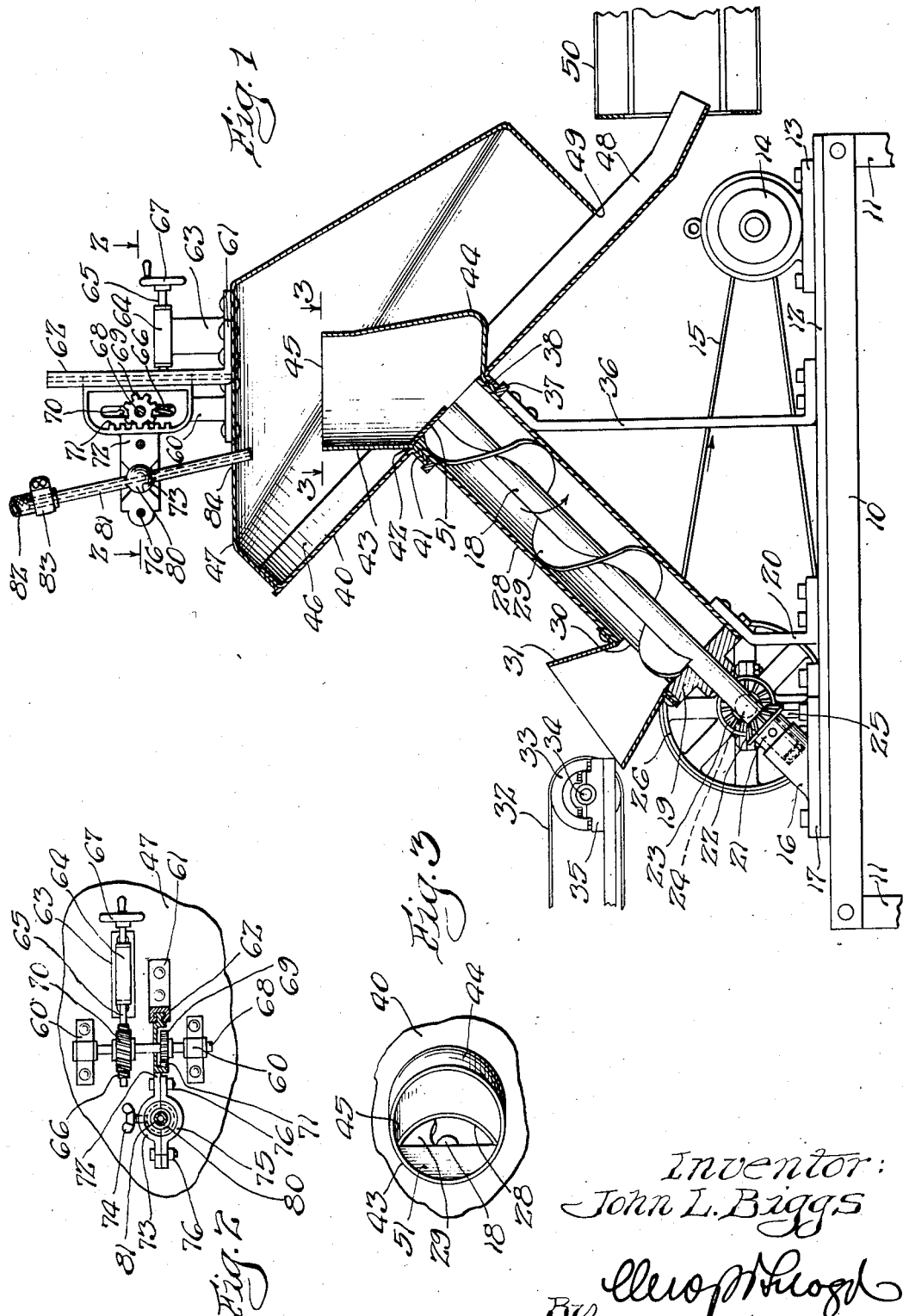
Inventor:
John L. Biggs Patented Nov. 14, 1933

1,935,385

UNITED STATES PATENT OFFICE 1,935,385

SHELL AND MEAT SEPARATOR

John L. Biggs, Chicago, Ill., assignor to Queen Anne Candy Company, Hammond, Ind., a corporation of Illinois Application April 14, 1930. Serial No. 444,043

9 Claims. (Cl. 146—8)

The present invention relates to a device adapted to separate nut meats from the shells enclosing such meats after the shells have been cracked, and it has particularly to do with the employment of a stream of compressed air, or the like, for the purposes indicated.

Nut cracking devices of many types have many times heretofore been devised, and nearly every plant in which fresh nut meats are produced has acquired its own particular form of shell cracker, or breaker. These devices are not altogether satisfactory, and but partially or fractionally release the nut meat.

Much and expensive hand labor is necessary for the purpose of completely freeing the nut meats from the cracked nuts, and it is this operation—freeing the meat from the cracked nut—which is probably the most wasteful in the whole nut shelling industry.

In addition to being, as a rule, hand work, the losses in materials in this operation are tremendous. The nut meats are valuable, and the losses are by theft as well as by inefficiency. The necessity for a machine to completely demolish a partially fractured nut and to separate the fractured shell from the nut meat has been felt for some time.

The primary object of the present invention, therefore, is to provide an efficient means for separating nut shells from nut meats through the employment of an air stream or the like.

A secondary object of the invention is to provide for a further cracking or breaking of nut shells in the course of their travel from a nut cracker machine to a mechanical nut and shell separator.

A still further object of the invention is to provide new and novel means for impressing an air stream upon broken nuts in order that the loosely adhering parts of shells may be separated one from another and from the nut meats contained therein without injury to the latter.

Another object of the invention is an improved method of separating nut meats and nut shells.

A still further object of the invention is the provision of a process of new and novel character for additionally cracking partially broken nuts, and for separating broken nuts into their shell portions and meat portions.

Another object of the invention is the provision of new and novel means and methods for segregating and separating nut meats and nut shells.

These objects, and such other objects as may hereinafter appear, are obtained by the novel construction, unique arrangement, and improved combination of the several elements which are assembled in the single embodiment of the invention illustrated in the accompanying drawing, and in which:—

Figure 1 is a vertical sectional view illustrative of an apparatus embodying the subject matter of the invention;

Figure 2 is a detail showing a control means for an air stream for use in a device, such as is illustrated in Figure 1, said figure being a transverse section on the line 2—2 of Figure 1; and Figure 3 is a transverse sectional view on the line 3—3 of Figure 1, and illustrates the interior of the separating chambers.

Like reference characters are used for similar parts in the drawing and in the description of the invention which is hereinafter given.

The machine illustrated is adapted to be mounted upon a platform 10 having legs 11 at the ends thereof. Other supporting means may be employed with equal facility.

The machine itself may comprise a base 12 upon which is disposed a motor base 13, the latter supporting a conventional electric motor 14, by which motive power is transmitted to a belt 15 linked to the device itself.

Upon a bracket 16, mounted upon a machine base 17, is a thrust support for an obliquely disposed main shaft 18. Said shaft 18 is suitable journaled in said bracket 16, and also is mounted for rotation in a collar 19 rigidly secured upon a bracket 20, which latter is also mounted upon the base 12.

The shaft 18 has a collar 21 riding on the base 16 and adjacent to which is disposed a gear 22. Gear 22 is in mesh with a gear 23 supported by a shaft 24 mounted in a bracket 25 and arranged for rotation in a horizontal plane, said shaft 24 having a pulley 26, around which the belt 15 travels. With the rotation of said pulley 26, and through the agency of shaft 24, the shaft 18 is rotated. Material fed into a casing in which shaft 18 rotated may thus be forced upwardly through such casing which comprises a shell 28, and the base 19 by a spiral flange 29 rigidly secured to the shaft 18.

Flange 29, which is secured to the shaft 18 so that the lower end of the flange 29 impinges or closely abuts the top face of collar 19. Thus, when the latter is rotating in the direction of the arrow in Figure 1, material within the casing 28 is forced upwardly therethrough by the said flange 29.

About an aperture 30 in the lower portion of the casing 28 is a hopper 31 secured to said casing by bolts or other means, said hopper also being secured to the end piece 19, if desired. There may be arranged in juxtaposition to said hopper 31 a conveyor belt 32 which travels about a pulley 33 mounted upon an axle 34 supported by a bracket 35, the conveyor 32 being but partially shown and being conventional. Any other suitable means, including hand loading, may be employed to bring material to and dump it into the hopper 31.

The casing 28 is further supported at its top by a bracket 36 which extends upwardly from the base 12 to the side of said casing 28, preferably upon the under side thereof, to provide a firm support for said casing 28 around the screw or shaft 18 and concentric therewith.

At the top end of the casing 28 is a collar 37 which is secured thereon just above the extremity of bracket 36. Two members encircle the top end of casing 28. One is a disk-like obliquely disposed sheet 40 which has flanges 41 concentrically arranged about the casing 28 and a hopper shortly to be mentioned. At the central portion of the sheet 40, there is an aperture 42 which is surrounded by the walls of a discharge hopper 43, the general direction of which hopper is vertically upward. Said hopper has a downwardly extending sleeve portion 38 which telescopes upon the end of casing 28, snugly fitting thereabout. Around such sleeve 38 the flange 41 is disposed.

In the hopper 43 is an expanded or enlarged section 44 adjacent to the discharge end of the shaft 18, and from the enlarged portion 44 of the hopper, the adjacent wall of said hopper 43 is constricted slightly as its uppermost section is approached, the wall of the hopper 43 becoming truly cylindrical adjacent to its mouth 45.

The sheet 40 may be provided with flanges 46 to provide a guide for a screen 47 preferably of foraminous material and shaped to provide a covering for the sheet 40 through which air may readily escape, but through which nut meats and nut shells are not easily forced. Any suitable means may be used for securing the screen upon the plate 40. The lower end of the sheet 40 terminates in a chute 48 through which material discharged through an orifice 49 in the screen 47 is adapted to be deposited in a hopper, box, conveyor, or other device 50, shown schematically at the lower right hand side of Figure 1.

Across the top of the casing 28 is a half-circular disk 51, which may be secured in position in any suitable manner. It is so disposed that the discharge from the casing 28 is therebelow and in the direction of the pocket 44 in the hopper 43. The plate 51 serves a purpose later to be noted.

Deposited upon suitable brackets 60, held upon a standard or other suitable supporting member, or mounted upon the screen 47, or which may be used to support the screen 47, is an air nozzle mounting member. At one side of the device and upon a bracket 61 is a housing 62. Upon a bracket 63 is a shaft journal 64, for a shaft 65 terminating in a worm 66.

The shaft 65 has at its end a hand wheel 67 by which it may be rotated. Between the brackets 60 is a shaft 68 which carries as a part thereof a pinion 69 and a gear 70, the latter being adapted to mesh with the worm 66.

Pinion 69 meshes with a rack 71 which is slidable upon a track formed in the housing 62 so that upon rotation of the shaft 65, the pinion 69 is in mesh with the rack 71 and causes said rack and the parts carried thereby to rise or fall relatively to the housing 62.

The rack 71 includes a housing from which projects an arm 72 from which an air nozzle is supported. The air nozzle mounting comprises a half spherical cup 73, having threaded therein at one side a wing nut 74. There is another half spherical member 75 which is adapted to be drawn into intimate contact with the cup 73 by bolts 76 passing between the material adjacent each of said members.

In this spherical seat formed by said members 73 and 75 is a ball 80 through which a nozzle 81 extends. Nozzle 81 is connected to an air line 82 by a hose coupling 83, so that, when the part 82 is secured to a source of compressed air, the compressed air may be projected through said nozzle 81 according to the direction given thereto through the ball member 80 therefor, which is adjusted in the seat formed of the parts 73 and 75, such adjustment being maintained by the thumb nut 74 which engages the ball member 80.

For the purpose of moving the nozzle 81 toward and away from the hopper 43, the hand wheel 67 is rotated in one direction or the other, so that the nozzle 81 is lifted by means of the rack and pinion heretofore described. An aperture 84 is provided in the screen 47, so that a wide variety of adjustments of the nozzle 81 are possible.

In the arrangement of the apparatus, heretofore described, it will be noted that the nozzle 81 is directed through the opening 84 so that a stream of air passing through the nozzle 81 will strike the plate 51 at a slight angle and adjacent to its free edge.

The fineness of the adjustment of the direction of the stream, of course, and its force as controlled by distance from objective, is governed by the adjustment of nozzle 81 and the locking nut 74, as well as by the elevation of the air nozzle by the means illustrated in Figure 2.

In operation, nuts after passing through a mechanical cracker or being otherwise broken, are fed into the hopper 31 by the belt conveyor 32, or by other suitable methods. Nuts which have been through cracking devices and which crack the shell do not, except in rare instances, have shells sufficiently broken or cracked to free the nut meats from the nut shells.

The cracked nuts are poured into the hopper 31, and by the rotation of the shaft 18, this material is elevated upon the flange 29 until it reaches the pocket 44 of the hopper 43.

At the top of the shaft 18, a constant and forceful stream of air is encountered, such stream being projected by the nozzle 81 and striking upon the plate 51 so that the flow of such stream is deflected into and in the direction of the pocket 44 directly across the path of the nuts that are being elevated in the hopper 43. The stream of air causes a brisk churning of the cracked nuts and a rapid rotation thereof in, around and about the hopper 43, and eventually, as more cracked nuts are elevated, into the hopper 43, the nuts and nut meats first encountered are elevated out of the hopper 43 through its mouth 45, to fall upon the plate 40 to roll thereover downwardly through the chute 47 and into the conveyor, hopper or box 50 for further use or separation.

The force of the air blown through the nozzle 81 causes a number of nuts to be blown violently from the hopper 43 through its mouth 45 and to prevent these shells and meats from escaping from the device, the screen 47 is provided. The force of the air is considerable. It penetrates into the spaces between the nut meat and the shell and far more deftly than the human hand, causes the meat and shell to be separated by a wedging of the air stream therebetween. Partially cracked nuts fed into the device are further broken up or cracked with the nut meats coincidentally being forced out of the shells but without mutilation.

The constant churning of the cracked nuts in the hopper 43 is such that the air blast strikes the partially broken nuts or fractions thereof in a manner that all angles thereof may be subject to the force of the stream of air. Thus, the nut shell is attacked from its weakest side with the result that there is obtained a rapid and effective, but not damaging, separation of the nut meat from the shell.

The broken apart and separated nut meats and shells, after they are conveyed into the device 50, may be then separated one from another in any suitable manner.

Many modifications of the present device can readily be had, the primary object of this application being to show one form of device in which a blast of air driven into a stream of broken nuts will cause the separation of the nut shells and nut meats.

I claim:

1. Means for separating nut meats and shells comprising an elevating conveyor for cracked nuts, a hopper with a top opening, a bottom opening, and an enlarged side and arranged to receive the conveyed nuts by way of said bottom opening, and means for directing an air blast downwardly into said hopper by way of said top opening and oppositely to said enlarged side.

2. Means for separating nut meats and shells comprising a hopper to receive cracked nuts, an elevator to force nuts into said hopper from beneath, a deflector in said hopper and partially covering said elevator, and means for directing an air blast against said deflector.

3. Means for separating nut meats and shells comprising a hopper to receive cracked nuts, an elevator forcing nuts into said hopper from beneath, a plate in the bottom of said hopper and in the path of said elevator, and means for directing a flow of air against said plate at an angle thereto.

4. Means for separating nut meats and shells comprising a hopper receiving cracked nuts at its bottom and discharging the received material at its top, and means for directing a flow of air into, across and out of said hopper.

5. Nut shell and meat separating means comprising a chamber, means for forcing cracked nuts upwardly therethrough, a hopper at the top of said chamber, and means for directing a flow of air into said hopper at substantially the plane of its joinder with said chamber.

6. Nut shell and meat separating means comprising a container, means for forcing cracked nuts therethrough, a hopper receiving said cracked nuts from beneath and discharging them from above, a plate dividing said container and said hopper, and means for directing a flow of air into said hopper.

7. Nut shell and meat separating means comprising a container, means for forcing cracked nuts therethrough, a hopper receiving said cracked nuts from beneath and discharging them from above, a plate dividing said container and said hopper, and means for directing a flow of air into said hopper against said plate.

8. Nut shell and meat separating means comprising a container, means for forcing cracked nuts therethrough, a hopper receiving said cracked nuts from beneath and discharging them from above, said hopper having a pocket in one side thereof, a plate dividing said container and hopper at the opposite side of said hopper, and means for directing a flow of air into said hopper against said plate.

9. Nut shell and meat separating means comprising a container, means for forcing cracked nuts therethrough, a hopper receiving said cracked nuts from beneath and discharging them from above, said hopper having a pocket in one side thereof, a plate dividing said container and hopper at the opposite side of said hopper, and means for directing a flow of air into said hopper from above and against said plate at an angle thereto.

JOHN L. BIGGS.